United States Patent [19]

Asai et al.

[11] Patent Number: 5,264,025
[45] Date of Patent: Nov. 23, 1993

[54] MANUFACTURING SYSTEM OF AND PROCESS FOR DEOXIDIZED WATER

[75] Inventors: Katsuya Asai, Higashikurume; Koji Saito, Kamakura; Teruo Tamaki, Setagaya, all of Japan

[73] Assignees: NGK Insulators, Ltd., Nagoya; Sapporo Breweries Limited, Tokyo, both of Japan

[21] Appl. No.: 940,219

[22] Filed: Sep. 8, 1992

[30] Foreign Application Priority Data

Sep. 6, 1991 [JP] Japan .................................. 3-255664

[51] Int. Cl.$^5$ ............................................... B01F 3/04
[52] U.S. Cl. ..................................... 95/263; 96/202; 261/123; 261/DIG. 7
[58] Field of Search ...................... 55/196, 46, 53, 55; 261/123, 122.1, DIG. 7

[56] References Cited

U.S. PATENT DOCUMENTS

| | | | |
|---|---|---|---|
| 3,083,953 | 4/1963 | Langdon et al. | 261/122 |
| 3,227,429 | 1/1966 | Renzi | 261/117 |
| 4,206,157 | 6/1980 | Plasmati | 261/123 |
| 4,350,503 | 9/1982 | Skoli et al. | 261/DIG. 7 |
| 4,592,834 | 6/1986 | Yang | 261/123 |
| 4,624,791 | 11/1986 | Ferriss | 55/196 |
| 4,869,852 | 9/1989 | Goudy, Jr. et al. | 261/122.1 |
| 4,882,130 | 11/1989 | Asai et al. | 422/310 |
| 5,006,133 | 4/1991 | Mandrin et al. | 55/53 |

FOREIGN PATENT DOCUMENTS

| | | |
|---|---|---|
| 154516 | 9/1985 | European Pat. Off. . |
| 391839 | 10/1990 | European Pat. Off. . |
| 584696 | 10/1933 | Fed. Rep. of Germany . |
| 3816041 | 11/1989 | Fed. Rep. of Germany . |
| 936733 | 7/1948 | France . |
| 1031045 | 3/1953 | France . |
| 85/00298 | 1/1985 | PCT Int'l Appl. . |
| 325884 | 3/1930 | United Kingdom ................ 261/123 |
| 674757 | 7/1952 | United Kingdom . |
| 951457 | 3/1964 | United Kingdom . |

OTHER PUBLICATIONS

European Brewery Convention, 17th Congress, 1979, Hoggan et al. "A simple production system for the deoxygenation of water", pp. 245-258.

*Primary Examiner*—Tim Miles
*Attorney, Agent, or Firm*—Armstrong, Westerman, Hattori, McLeland & Naughton

[57] ABSTRACT

A system and process for manufacturing deoxidized water by the step of dissolving inert gas such as carbon dioxide into available water in a fine bubbled condition for exchange with oxygen in the water. The system includes an upright packed tower (21) having an upper end portion provided with an inlet connected to a source of water (27a) to be deoxidized and a bottom portion provided with an outlet connected to a storage tank (27b), multilayered packing elements (22) assembled within the packed tower (21), the packing elements each being in the form of a honeycomb structure formed with mutually crossed passages (22a, 22b) inclined at a predetermined angle with respect to an axial longitudinal direction of the packed tower, a primary supply device (23) for supplying inert gas into the packed tower, and a diffuser (23a) contained within the bottom portion of the packed tower and connected to the primary supply device (23) for diffusing the inert gas supplied therefrom into the interior of the packed tower in a fine bubbled condition.

3 Claims, 4 Drawing Sheets

MANUFACTURING SYSTEM OF AND PROCESS FOR DEOXIDIZED WATER

BACKGROUND OF THE INVENTION

1. Field of the Invention

The present invention relates to a system for manufacturing deoxidized water by the step of dissolving inert gas such as carbon dioxide into available water in a fine bubbled condition for exchange with oxygen in the water.

2. Description of the Prior Art

In the fields of food and beverage industries, semiconductor industries, etc., it is required to manufacture a large amount of deoxidized water from available water. As one of systems for manufacturing the deoxidized water, there has been proposed a system for dissolving highly soluble inert gas such as carbon dioxide into the available water in a fine bubbled condition for exchange with oxygen in the water.

As shown in FIG. 5, the conventional manufacturing system includes a treatment tank 11 connected at its inlet to a water tank 14 through a primary carbon dioxide supply means 12 and a water pump 13 and at its outlet to a storage tank 16 through a discharge pump 15 and a secondary carbon dioxide supply means 18. In operation of the water pump 13 and discharge pump 15, the water from water tank 14 is supplied into the treatment tank 11 through the primary carbon dioxide supply means 12 and discharged from the treatment tank 11 into the storage tank 16 through the secondary carbon dioxide supply means 18 to be stored as deoxidized water for use. In the manufacturing system, the primary carbon dioxide supply means 12 is arranged to supply carbon dioxide from its supply source into the water in a fine bubbled condition, and the treatment tank 11 is depressurized by operation of a vacuum pump 17 to discharge therefrom the carbon dioxide exchanged with oxygen in the supplied water. In the storage tank 16, the deoxidized water from the treatment tank 11 is stored in a deoxidized condition under supply of the carbon dioxide from the secondary supply means 18.

In such a system as described above, however, the supplied water is retained in the treatment tank 11 for an appropriate time during which the oxygen in the water is exchanged with the carbon dioxide and discharged from the treatment tank 11. To enhance the deoxidation efficiency of the water, it is required to make the system large in size for increasing the supply amount of carbon dioxide into the water. It is also required to prolong the retention time of the water in the treatment tank 11.

SUMMARY OF THE INVENTION

It is, therefore, a primary object of the present invention to provide a manufacturing system of deoxidized water capable of being constructed smaller in size than the conventional system and of enhancing the deoxidation efficiency of the available water.

According to the present invention, the object is accomplished by providing a system for manufacturing deoxidized water by the step of dissolving inert gas such as carbon dioxide into available water in a fine bubbled condition for exchange with oxygen in the water, which system comprises an upright packed tower having an upper end portion provided with an inlet connected to a source of water to be deoxidized and a bottom portion provided with an outlet connected to a storage tank, multilayered packing elements assembled within the packed tower, the packing elements each being in the form of a honeycomb structure formed with mutually crossed passages inclined at a predetermined angle with respect to an axial longitudinal direction of the packed tower, a primary supply means for supplying inert gas into the packed tower, and diffusion means contained within the bottom portion of the packed tower and connected to the primary supply means for diffusing the inert gas supplied therefrom into the interior of the packed tower in a fine bubbled condition.

BRIEF DESCRIPTION OF THE DRAWINGS

Other objects, features and advantages of the present invention will be more readily appreciated from the following detailed description of a preferred embodiment thereof when taken together with the accompanying drawings, in which.

DESCRIPTION OF THE PREFERRED EMBODIMENT

Figure 1:
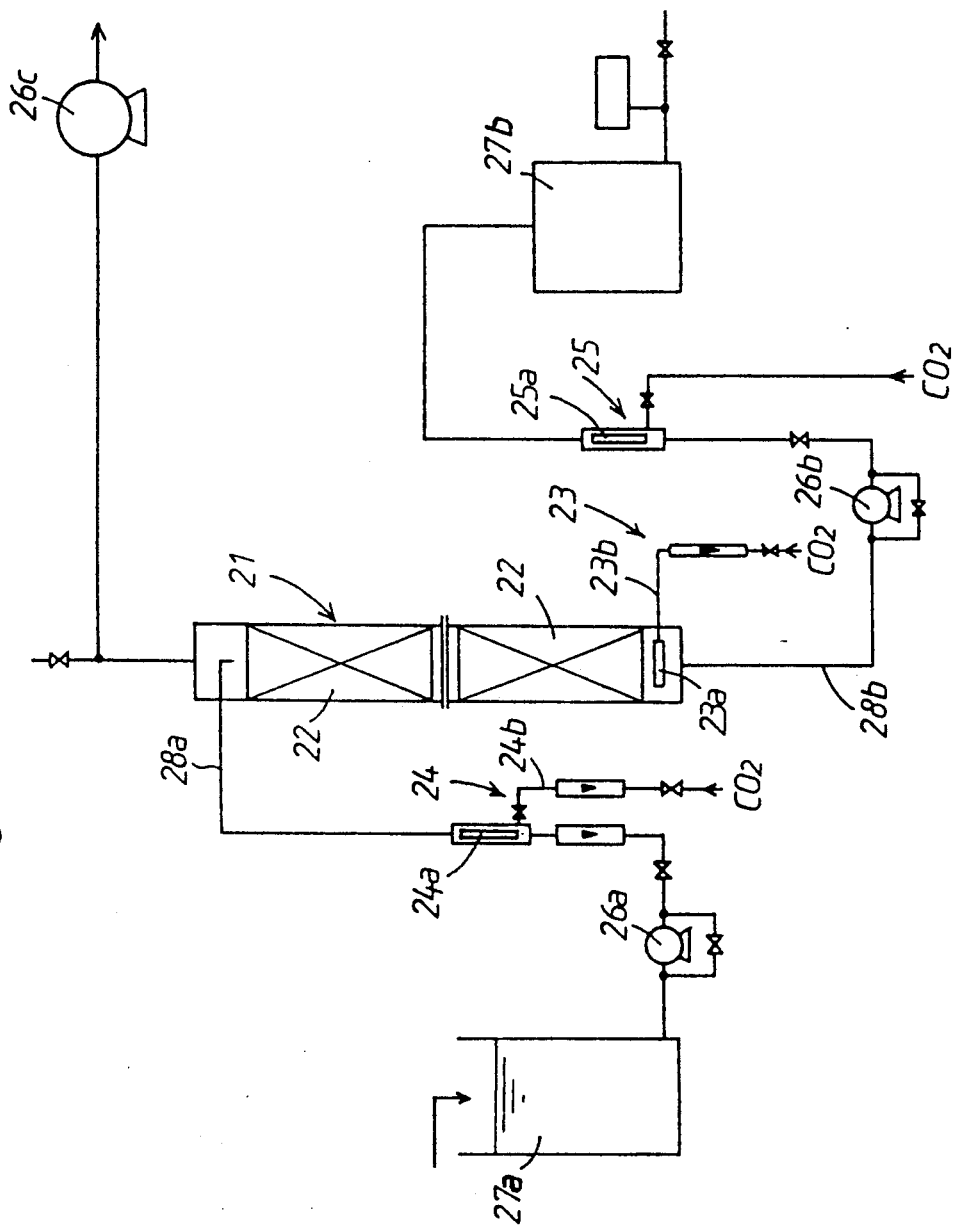
FIG. 1 is a schematic illustration of a manufacturing system of deoxidized water in accordance with the present invention.

In FIG. 1 of the drawings, there is schematically illustrated a manufacturing system of deoxidized water which includes an upright packed tower 21 provided at its upper end portion with an inlet connected to a water tank 27a by means of a water supply conduit 28a and at its bottom portion with an outlet connected to a storage tank 27b by means of a discharge conduit 28b. The upright packed tower 21 contains a number of multilayered packing elements 22 shown in FIGS. 2 and 3 and is connected at its bottom portion to a primary carbon dioxide supply means 23. The water supply conduit 28a is provided with a water pump 26a and connected to a secondary carbon dioxide supply means 24, while the discharge conduit 28b is provided with a discharge pump 26b and connected to a tertiary carbon dioxide supply means 25.

The primary carbon dioxide supply means 23 includes a plurality of porous ceramic tubes 23a disposed in parallel to one another within the bottom portion of packed tower 21. The porous ceramic tubes 23a each are closed at their one ends and connected at their other ends to a supply source of carbon dioxide by means of a conduit 23b. When supplied with carbon dioxide from the supply source, the porous ceramic tubes 23a act to diffuse the carbon dioxide therefrom into the interior of packed tower 21 in a fine bubbled condition. The secondary and tertiary carbon dioxide supply means 24 and 25 are constructed substantially in the same manner as the primary carbon dioxide supply means 23. The porous ceramic tubes 24a of the secondary carbon dioxide supply means 24 are disposed within the water supply conduit 28a coaxially therewith to diffuse the supplied carbon dioxide therefrom into the water flowing through the water supply conduit 28a in a fine bubbled condition. Similarly, the porous ceramic tubes 25a of the tertiary carbon dioxide supply means 25 are disposed within the discharge conduit 28b coaxially therewith to diffuse the supplied carbon dioxide therefrom into deoxidized water discharged from the packed tower 21 in a fine bubbled condition.

Figure 2:
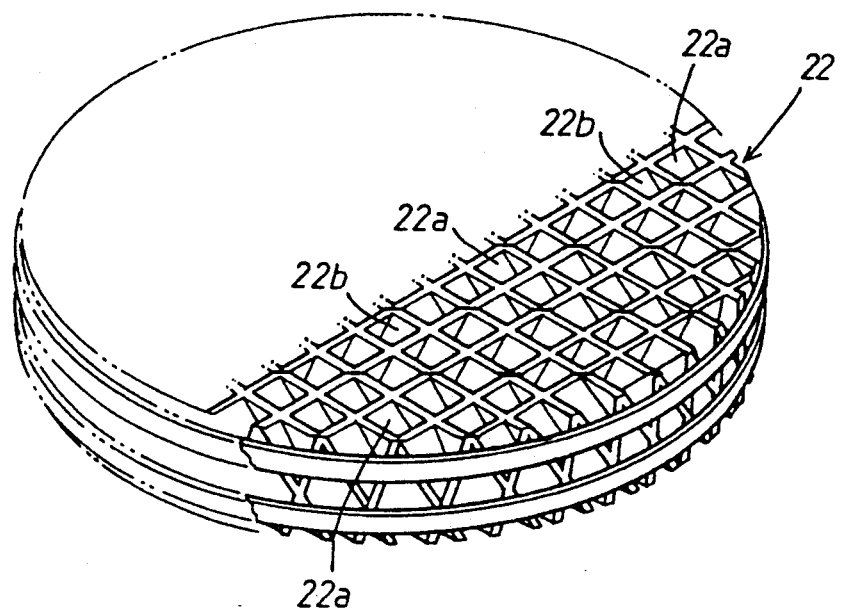
FIG. 2 is a perspective view of a packing element assembled within a packed tower shown in FIG. 1.
Figure 3:
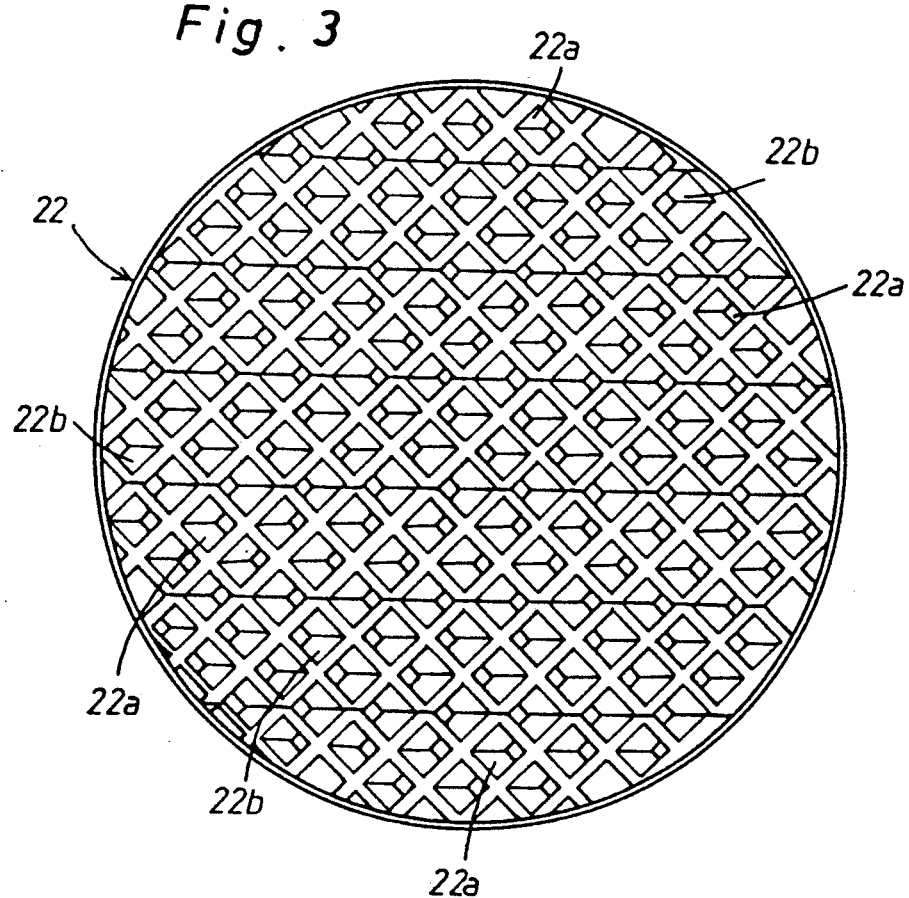
FIG. 3 is a plan view of the packing element shown in FIG. 2.

As shown in FIGS. 2 and 3, each of the packing elements 22 is in the form of a honeycomb structure made of ceramic material and formed with a number of first passages 22a inclined at a predetermined angle in one direction with respect to the axial direction of packed tower 21 and a number of second passages 22b inclined at the predetermined angle in another direction with respect to the axial direction of packed tower 21. In this embodiment, the first and second passages 22a and 22b are inclined approximately at 30° with respect to the axial direction of the packed tower 21, and the honeycomb structures 22 are multilayered and assembled as a unit respectively within the upper and lower portions of packed tower 21.

In operation of the manufacturing system of the present invention, the vacuum pump 26c is driven to depressurize the interior of packed tower 21 and maintain the same in a depressurized condition, while the water pump 26a is driven to supply the water from the water tank 27a into the depressurized interior of packed tower 21 at a predetermined flow rate so that the surface of the supplied water is maintained slightly above the upper end of the multilayered honeycomb structures 22. In such a condition, the discharge pump 26b is driven to flow down the supplied water through the mutually crossed passages 22a, 22b of honeycomb structures 22 and discharge the water from the bottom of packed tower 21 into the storage tank 27b through the discharge conduit 28b.

During such operation as described above, the packed tower 21 is supplied at its bottom portion with a predetermined amount of carbon dioxide from the primary carbon dioxide supply means 23, while the water supply conduit 28a and discharge conduit 28b each are supplied with a predetermined amount of carbon dioxide respectively from the secondary and tertiary carbon dioxide supply means 24 and 25. The carbon dioxide from the primary supply means 23 is diffused as fine bubbles from the porous ceramic tubes 23a into the bottom portion of packed tower 21. The carbon dioxide from the secondary supply means 24 is ejected as fine bubbles from the porous ceramic tubes 24a into the water supply conduit 28a, while the carbon dioxide from the tertiary supply means 25 is ejected as fine bubbles from the porous ceramic tubes 25a into the discharge conduit 28b. Thus, the water from water tank 27b is deoxidized by exchange with the carbon dioxide supplied into the water supply conduit 28a and is further deoxidized by exchange with the carbon dioxide supplied into the depressurized interior of packed tower 21 while flowing down through the mutually crossed passages 22a, 22b of the multilayered honeycomb structures 22. The deoxidized water is discharged from the bottom portion of packed tower 21 into the storage tank 27b through the discharge conduit 28b and stored in the storage tank 27a in a deoxidized condition under supply of the carbon dioxide from the tertiary supply means 25.

As is understood from the above description, the water supplied into the depressurized interior of packed tower 21 flows down through labyrinth passages 22a, 22b of multilayered honeycomb structures 22 during which the water is effectively brought into contact with the fine bubbles of carbon dioxide supplied into the bottom portion of tower 21. This is effective to enhance the exchange efficiency of the carbon dioxide with the oxygen in the water. It is, therefore, able to decrease the supply amount of carbon dioxide for reducing the amount of oxygen in the water to a predetermined value. Thus, the manufacturing system of deoxidized water can be constructed smaller in size than the conventional system, and the deoxidation efficiency of the water can be increased more than 99% to enhance the treatment capability of the water for noticeably increasing the manufacturing amount of deoxidized water per hour.

Figure 4:
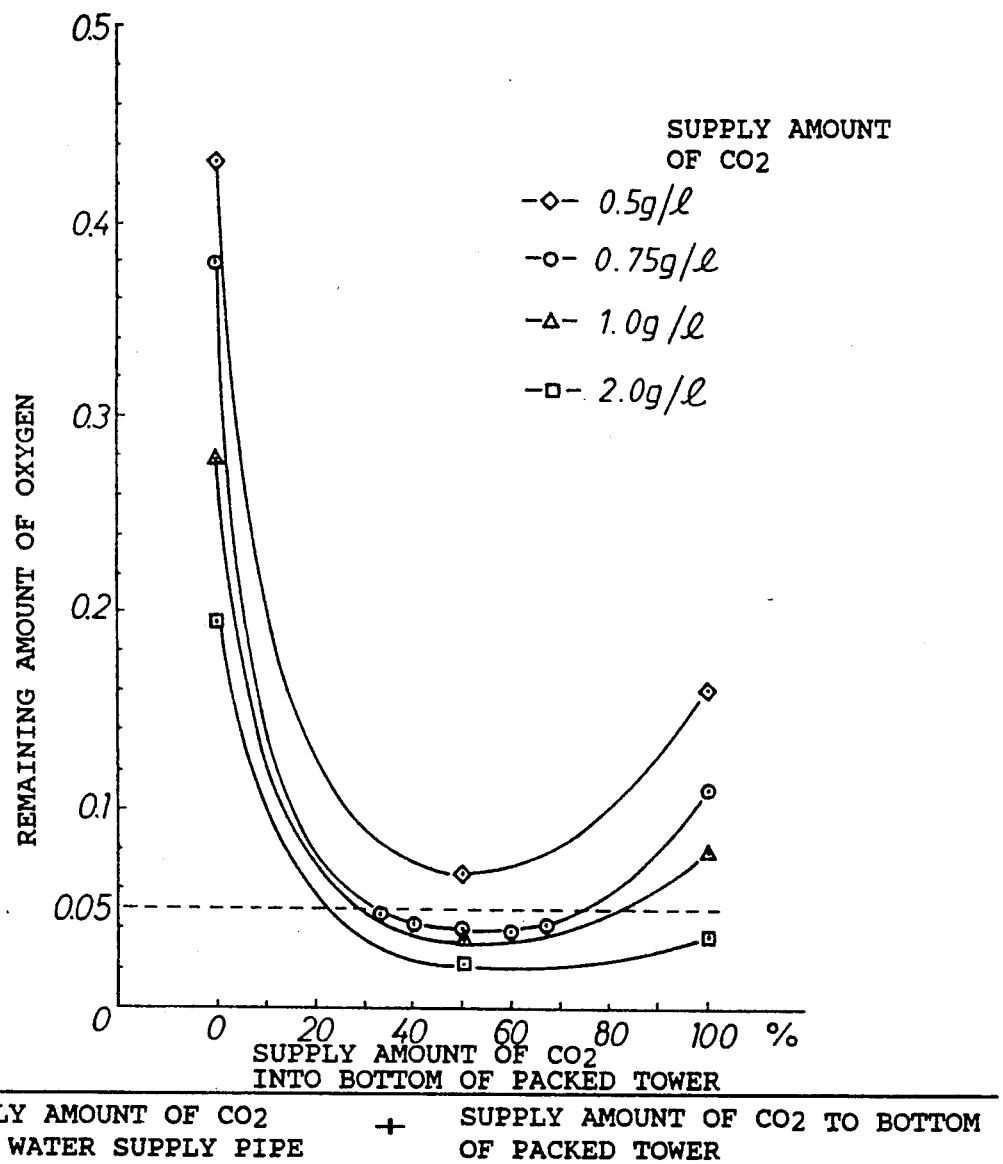
FIG. 4 is a graph showing a remaining amount of oxygen in relation to a supply amount of carbon dioxide.
Figure 5:
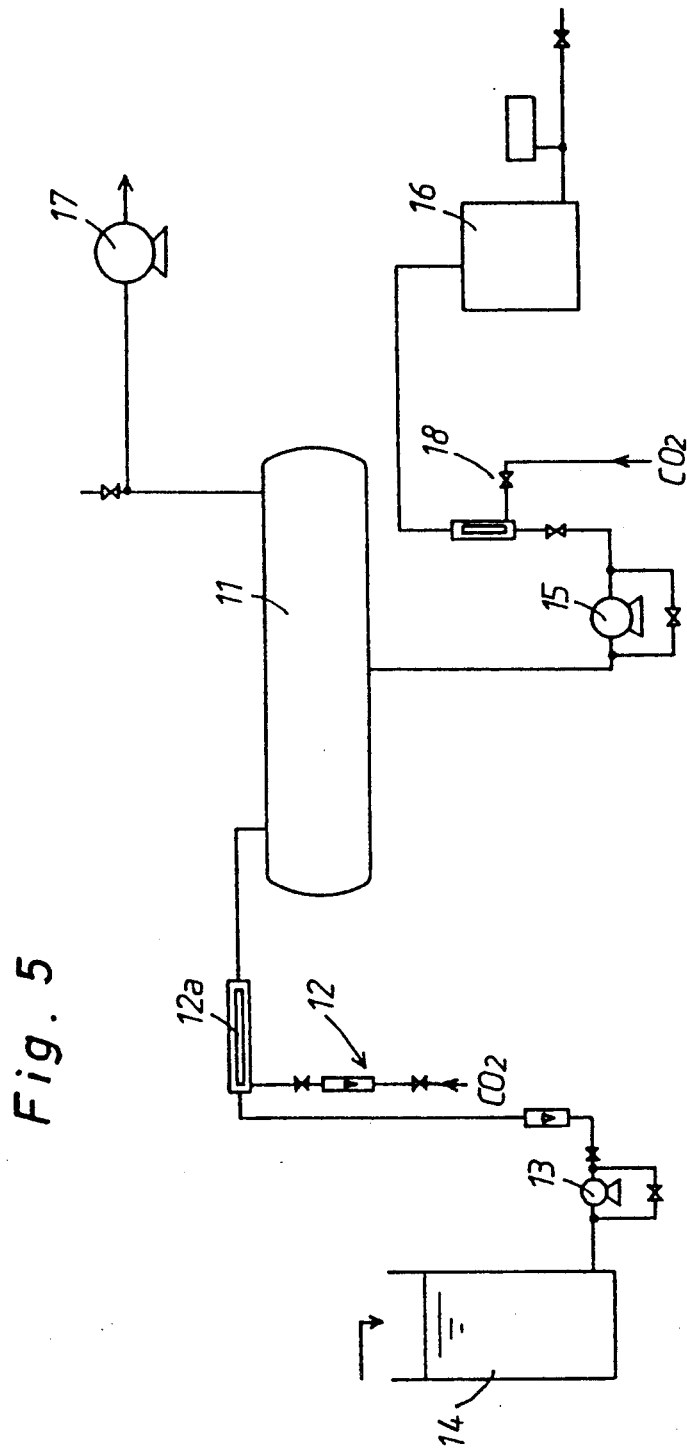
FIG. 5 is a schematic illustration of a conventional manufacturing system of deoxidized water.

In experiments of the manufacturing system of the present invention in comparison with the conventional system shown in FIG. 5, a result of the first experiment has been obtained as shown in FIG. 4 and the following Tables 1 and 2 in a condition described below.

1) Water to be deoxidized:
The amount of oxygen in the water: 8 ppm
The flow quantity of the water: 400 l/hr
The water temperature: 20° C.
2) The pressure in the packed tower: 75 Torr
3) The supply amount of carbon dioxide to the water: As shown in FIG. 4.

A result of the second experiment has been obtained as shown in the following Table 3, provided that the supply amount of carbon dioxide was determined to be 1 g/l and that the supply amount of water was determined as shown in Table 3.

In the experiment of the manufacturing system of the present invention, the carbon dioxide was supplied from the primary and secondary supply means 23 and 24 at various ratios, and the total supply amount of the carbon dioxide was determined as indicated respectively in FIG. 4 and Tables 1 to 3. In the conventional system shown in FIG. 5, all the carbon dioxide was supplied from the supply means 12. In the respective experiments, each remaining amount of oxygen in the deoxidized water was measured by sampling at each downstream of the discharge pumps 15, 26b. In the experiment of the conventional system, the manufacturing amount of deoxidized water produced per hour was determined to be the same amount as that in the system of the present invention. A result of the experiment is indicated as a comparative example 1 in Tables 1 and 3. Additionally, the honeycomb structures 22 in the system of the present invention were replaced with a Raschig ring $1^B$ of the same capacity as that of the honeycomb structures 22 for the same experiment the result of which is indicated as a comparative example 2 in Tables 1 and 3.

In the case that the supply amount of carbon dioxide was determined to be constant, it has been found that as shown in FIG. 4, a maximum deoxidation is effected when the carbon dioxide is supplied from the primary and secondary supply means 23 and 24 at the same ratio. The maximum deoxidation has been effected even when the total supply amount of carbon dioxide was changed. In Table 1, the remaining amount of oxygen and the deaeration efficiency obtained by supply of the carbon dioxide from both the supply means 23 and 24 at the same ratio are indicated in comparison with those in the examples 1 and 2. In Table 2, the remaining amount of oxygen and the deaeration rate obtained by supply of the carbon dioxide only from the primary supply means 23 are indicated. In Table 3, the remaining amount of oxygen and the deaeration efficiency in relation to the supply amount of water are indicated in comparison with those in the examples 1 and 2.

As is understood from Table 1, the remaining amount of oxygen in the system of the present invention is noticeably decreased in comparison with the examples 1 and 2, and also the deaeration efficiency is noticeably increased in comparison with the examples 1 and 2. Particularly, the deaeration efficiency is increased more than 99%. Such a result as indicated in Table 1 is obtained in the case that the carbon dioxide is supplied from the primary and secondary supply means 23 and 24 at the same ratio. In the case that the carbon dioxide is supplied only from the primary supply means 23, such a result as indicated in Table 2 is obtainable. Although the result of Table 2 is inferior to the result of Table 1, it is superior to the result of the example 1 shown in Table 1. From the result indicated in Table 3, it has been found that a better result is obtained when the supply amount of water per hour is controlled to a smaller amount. In comparison with the example 2, it will be understood that the deaeration efficiency in the system of the present invention is greatly increased since the surface area of the honeycomb structures 22 is more than two times the surface of the Raschig ring.

Summing up the foregoing results, it is indispensable in the manufacturing system of the present invention to adapt the primary carbon dioxide supply means 23 and the honeycomb structures 22 to the packed tower 21. To further enhance the deaeration efficiency of the water, it is desirable that both the primary and secondary carbon dioxide supply means 23 and 24 are provided in such a manner as to supply the carbon dioxide into the water at the same ratio.

TABLE 1

| Supply amount of $CO_2$ (g)/ Supply amount of water (l) | Remaining amount of oxygen (ppm) | | | Deaeration rate efficiency (%) | | |
| --- | --- | --- | --- | --- | --- | --- |
| | Ex. 1 | Ex. 2 | Inv. | Ex. 1 | Ex. 2 | Inv. |
| 0.50 | 0.435 | 0.112 | 0.070 | 94.6 | 98.6 | 99.1 |
| 0.75 | 0.390 | 0.073 | 0.040 | 95.1 | 99.1 | 99.5 |
| 1.00 | 0.277 | 0.055 | 0.032 | 96.5 | 99.3 | 99.6 |
| 2.00 | 0.195 | 0.041 | 0.022 | 97.6 | 99.5 | 99.7 |

TABLE 2

| Supply amount of $CO_2$ (g)/ Supply amount of water (l) | Remaining amount of oxygen (ppm) | Deaeration rate efficiency (%) |
| --- | --- | --- |
| 0.50 | 0.160 | 98.0 |
| 0.75 | 0.110 | 98.6 |
| 1.00 | 0.078 | 99.0 |
| 2.00 | 0.035 | 99.6 |

TABLE 3

| Supply amount of water (l/hr) | Remaining amount of oxygen (ppm) | | | Deaeration rate efficiency (%) | | |
| --- | --- | --- | --- | --- | --- | --- |
| | Ex. 1 | Ex. 2 | Inv. | Ex. 1 | Ex. 2 | Inv. |
| 400 | 0.277 | 0.055 | 0.032 | 96.5 | 99.3 | 99.6 |
| 300 | 0.155 | 0.040 | 0.108 | 98.1 | 99.5 | 99.8 |
| 200 | 0.085 | 0.033 | 0.012 | 98.9 | 99.6 | 99.9 |

What is claimed is:

1. A system for manufacturing deoxidized water by the step of dissolving oxygen gas-free inert gas such as carbon dioxide into available water in a fine bubbled condition for exchange with oxygen in the water, comprising:

a cylindrical housing having a first end portion provided with an inlet connected to a source of water to be deoxidized and a second end portion provided with an outlet connected to a storage tank;

multilayered packing elements assembled within said cylindrical housing, said packing elements each being in the form of a honeycomb structure of ceramic material formed with mutually crossed passages inclined at a predetermined angle with respect to an axial longitudinal direction of said cylindrical housing;

a primary supply means for supplying oxygen gas-free inert gas into the second end portion of said cylindrical housing;

a secondary supply means for supplying oxygen gas-free inert gas into a water supply conduit connecting said source of water to the inlet of said cylindrical housing;

wherein the manufacturing system further comprises:

vacuum pump means connected to the first end portion of said cylindrical housing to be driven during operation of the manufacturing system for depressurizing the interior of said cylindrical housing and maintaining the same in a depressurized condition; and diffusion means contained within the second end portion of said cylindrical housing and connected to said primary supply means for diffusing the oxygen gas-free inert gas supplied therefrom into the interior of said cylindrical housing in a fine bubbled condition.

2. A system for manufacturing deoxidized water by the step of dissolving oxygen gas-free inert gas such as carbon dioxide into available water in a fine bubbled condition for exchange with oxygen in the water, comprising:

an upright packed tower having an upper end portion provided with an inlet connected to a source of water to be deoxidized and a bottom portion provided with an outlet connected to a storage tank;

multilayered packing elements assembled within said packed tower, said packing elements each being in the form of a honeycomb structure of ceramic material formed with mutually crossed passages inclined at a predetermined angle with respect to an axial longitudinal direction of said packed tower;

a primary supply means for supplying oxygen gas-free inert gas into the bottom portion of said packed tower;

a secondary supply means for supplying oxygen gas-free inert gas into a water supply conduit connecting said source of water to the inlet of said packed tower;

wherein the manufacturing system further comprises:

vacuum pump means connected to the upper end portion of said packed tower to be driven during operation of the system for depressurizing the interior of said packed tower and maintaining the same in the depressurized condition; and diffusion means contained within the bottom portion of said packed tower and connected to said primary supply means for diffusing the oxygen gas-free inert gas supplied therefrom into the interior of said packed tower in a fine bubbled condition.

3. A method of manufacturing deoxidized water by using an upright packed tower having an upper end portion provided with an inlet connected to a source of water to be deoxidized and a bottom portion provided with an outlet connected to a storage tank, said packed tower containing therein multilayered packing elements each in the form of a honeycomb structure of ceramic material formed with mutually crossed passages inclined at a predetermined angle with respect to an axial longitudinal direction of said packed tower, comprising the steps of:

a) depressurizing the interior of said packed tower at its upper end portion and maintaining the same in a depressurized condition;

b) supplying an amount of oxygen gas-free inert gas into a water supply conduit connecting said source of water to the inlet of said packed tower;

c) supplying substantially the same amount of oxygen gas-free inert gas into the bottom portion of said packed tower as the amount of inert gas supplied into the water supply conduit; and diffusing the oxygen gas-free inert gas supplied into the bottom portion of said packed tower in a fine bubbled condition.

* * * * *